United States Patent Office 3,702,235
Patented Nov. 7, 1972

3,702,235
PROCESS FOR THE DETECTION OF HYDROGEN SULFIDE IN DRILL BIT CUTTING
Wayne S. Fallgatter, Tulsa, Okla., assignor to Cities Service Oil Company
No Drawing. Filed June 25, 1971, Ser. No. 157,057
Int. Cl. G01n 31/22, 33/24
U.S. Cl. 23—230 R         8 Claims

ABSTRACT OF THE DISCLOSURE

Drill bit cuttings are ground in the presence of a hydroxonium ion, subsequently vacuum filtered and rinsed with distilled water in order to provide a filtrate. The filtrate is introduced into a flask containing a zinc powder, utilized in conjunction with hydrogen chloride to provide a sweep gas of hydrogen, in order to evolve hydrogen sulfide which is then qualitatively and quantitatively detected. The process allows testing of cuttings of water or oil base muds to yield accurate determinations of amount of hydrogen sulfide originally present in the drill bit cuttings.

BACKGROUND OF THE INVENTION

The present invention relates to a process for the detection of hydrogen sulfide deposits. More particularly, the present invention relates to a process wherein wellbore drill bit cuttings are analyzed for hydrogen sulfide content in order to determine the presence of a hydrogen sulfide deposit.

Often, hydrogen sulfide is produced in conjunction with natural gas exhibiting an especially deleterious effect on drill pipe drilling equipment. The hydrogen sulfide normally discovered with natural gas production, in addition, is generally contained in the formation under high pressures. These pressures create hazardous conditions within the drill pipe and test equipment which are not designed to withstand hydrogen sulfide under these corrosive conditions. Recent deep drilling activities in the United States have led to increased discoveries of high pressure-hydrogen sulfide rich natural gas. Hydrogen sulfide content may range from one percent to over 75 percent by volume of the gas phase and therefore may represent a major proportion of the gas volume. This gas has a market value that merits an exploration effect. The extremely poisonous nature of hydrogen sufide gas contained within the formations, coupled with the tendency of the confined hydrogen sulfide rich gas to exhibit abnormally high pressures, makes the encounterance of these formations during drilling particularly dangerous.

Several conventional methods have been utilized in the past, including the simple correlation of hydrogen sulfide subsurface mapping through control with other wells in the area, for the determination of high pressure hydrogen sulfide deposits. A first of these methods is the detection of decrease in shale density in the transition zone to a high pressure reservoir. This technique has the disadvantage of being affected by lithology and yields similar results for any gas so that it is not specific for the presence of high pressure hydrogen sulfide. Another technique utilized is to chemically analyze the formation samples above a suspected reservoir for hydrogen sulfide. Disadvantages of this technique are that hydrogen sulfide is extremely reactive, and, therefore, outside of the reservoir may not exist as a free gas. There is some uncertainty as to the analysis for the presence of hydrogen sulfide. For an accurate analysis of hydrogen sulfide, it is necessary to develop a detection technique which is specific and does not exhibit the disadvantages previously mentioned. What is required is a process for detecting hydrogen sulfide prior to the high pressure hydrogen sulfide zone being encountered by a drill bit.

It is an object of the present invention to provide a process for the detection of high pressure hydrogen sulfide deposits.

It is a further object of the present invention to provide an analytical procedure whereby hydrogen sulfide content may be determined both qualitatively and quantitatively through monitoring of the amount of hydrogen sulfide contained within drill bit cuttings.

It is still a further object of the present invention to provide a process whereby the amount and quality of hydrogen sulfide present in drill bit cuttings may be analyzed through the utilization of a simplified wellhead testing procedure.

With these and other objects in mind, the present invention may be more fully understood through the following description and discussion:

SUMMARY OF THE INVENTION

The objects of the present invention are accomplished through use of a process for the detection of the presence of hydrogen sulfide contained within drill bit cuttings. The process comprises the steps of mixing the drill bit cuttings in the presence of a hydroxonium ion, filtering solids from the mixture formed therewith while washing the filtered solids with distilled water; and combining the filtrates from the washing and filtering steps. Free hydrogen is then passed through the filtrate. The hydrogen sulfide generated from the drill bit cuttings is measured in order to complete the process of the present invention. It is preferred that the hydroxonium ion be provided through use of an aqueous solution of sodium hydroxide and it is preferred that the aqueous sodium hydroxide concentration be from about 1.0 to about 10.0 weight percent sodium hydroxide in water.

It is a further preferred embodiment of the present invention that the free hydrogen be produced by the addition of zinc metal shot and hydrogen chloride to the filtrate. It is further preferred that the hydrogen sulfide be measured either colorimetrically or gravimetrically through absorption of the hydrogen sulfide produced on an absorbent which is either discolored through absorption or increased in weight through absorption for the measurement qualitative and quantitative of the presence of hydrogen sulfide.

DETAILED DESCRIPTION OF THE INVENTION

Hydrogen sulfide contained within subterranean reservoirs may be determined through analysis of drill bit cuttings from the overlying formations into which hydrogen sulfide has permeated. These trace concentrations of hydrogen sulfide normally exist as adsorbed free gas, rather than as a sulfide in combination with other elements, for example iron sulfide. The sulfide concentration is relatively stable within drill bit cuttings through utilization of the process of the present invention so that one may analyze analytically for an adequate indication of adsorbed hydrogen sulfide content. The process of the present invention comprises a procedure of grinding the drill bit cuttings in the presence of a hydroxonium, for example an aqueous solution of sodium hydroxide, which releases the adsorbed hydrogen sulfide soluble salt. This solution is filtered to remove the filtrate containing the dissolved hydrogen sulfide, or other cation sulfide, with residual solids being rinsed with water, preferably distilled, in order to gather all the sulfide ions. The ionic sulfide filtrate is placed in a flask and contacted with a hydrogen sweep gas, for example through the introduction of hydrogen chloride and zinc metal powder, in order to evolve a hydrogen sulfide gas. The hydrogen sulfide gas produced is then detected through various and sundry means, for example detection tubes specific for hydrogen sulfide which may either yield colorimetric or gravimetric type determinations. The present invention may be most readily understood through referral to the following examples:

EXAMPLE I

The following experimentation was conducted in order to determine the amount of hydrogen sulfide which may be absorbed on drill bit cuttings when exposed to a large excess of hydrogen sulfide present in a formation. Seven samples were prepared by solvent washing the drill bit cuttings with hot toluene in a soxhlet extractor to remove any oil or water present. Fifty grams of the dried cuttings were then added to a container, evacuated, and hydrogen sulfide gas introduced under some unknown pressure. The cuttings with hot toluene in a Soxhlet extractor to remove to and including thirteen days and then exposed to the atmosphere for various periods of time up to seven days. The seven samples were then ground in the presence of 10 milliliters each of 3.0 percent by weight sodium hydroxide, filtered through a Whatman No. 42 filter paper, using vacuum, while washing the solids with distilled water. The filtrate was placed with two grams of 20–30 mesh zinc shot and 20 milliliters of 1:1 volume hydrogen chloride in water, in a 125 milliliter Erlenmeyer flask. Several hydrogen sulfide detector tubes were connected in series to the flask. Hydrogen gas was generated through reaction of the zinc and hydrogen chloride, sweeping hydrogen sulfide gas into the detector tubes. The length of black stain within the hydrogen sulfide detector tube was measured in order to calculate the amount of hydrogen sulfide present in the samples. Each fully stained detector tube contained 0.28 milligram of hydrogen sulfide. A blank sample was run with a small detector tube through which full length staining represented 0.024 milligram of hydrogen sulfide present. The blank was run in order to show the sensitivity of the analytical process of the present invention. Table I depicts the results of these experiments.

TABLE I
Synthetically exposed drill bit cutting results

| Time exposed to atmosphere after $H_2S$ exposure (hr.) | Sample weight (g.) | $H_2S$ present through detection (mg.) | $H_2S$ present (p.p.m.) |
| --- | --- | --- | --- |
| 1.0 | 0.050 | 0.04 | 800 |
| 1.0 | 0.212 | 0.16 | 750 |
| 4.0 | 0.345 | 0.28 | 810 |
| 72.0 | 0.352 | 0.196 | 560 |
| 168.0 | 0.664 | 0.372 | 560 |
| 168.0 | 0.684 | 0.402 | 590 |
| (1) | 1.963 | 0.012 | 6 |

[1] No hydrogen sulfide exposure.

EXAMPLE II

In order to determine the efficiency of the hydrogen sulfide determination when a large amount of hydrogen sulfide is present in a formation encountered by a drill bit utilizing an oil base mud, thirty-one grams of oily drill bit cuttings were placed in a container. Air was evacuated from the container and hydrogen sulfide introduced for eight days. Three samples were then exposed to the atmosphere for from one hour to three days. These samples and a blank were then mixed with 10.0 milliliters of 3.0 percent by weight sodium hydroxide, as in Example 1, to form a fine slurry which was filtered under vacuum in a funnel using Whatman No. 42 filter paper. The residual solids were rinsed continually with a minimum amount of distilled water, to avoid excessive volume, such that about 10 to about 20 milliliters of distilled water rinse was utilized. The filtrate was placed in 125 milliliter Erlenmeyer flask containing 2.0 grams of zinc shot of 20–30 mesh in conjunction with 20 milliliters of 1:1 volume hydrochloric acid. The flask was stoppered immediately allowing gases to flow through a Kitagawa 120a high-range 0.01–0.17% hydrogen sulfide tube fit snugly into the stopper. Each 120a tube completely stained by $H_2S$ was found to be equivalent to 0.23% hydrogen sulfide calibrated for 100 milliliters of an air sample. One hundred milliliters of air weighs 122 milligrams. Therefore, the following concentrations given in Table II were found for the samples tested as they were withdrawn from the oily drill bit cuttings.

TABLE II
Synthetically exposed oily drill bit cutting results

| Time exposed to atmosphere after $H_2S$ exposure (hr.) | Sample weight (g.) | $H_2S$ present through detection (mg.) | $H_2S$ present (p.p.m.) |
| --- | --- | --- | --- |
| 1.0 | 0.1 | 0.91 | 9,100 |
| 5.0 | 0.05 | 0.23 | 4,600 |
| 72.0 | 0.1 | 0.36 | 3,600 |
| (1) | 12.0 | 0.098 | 8 |

[1] No hydrogen sulfide exposure.

EXAMPLE III

Hydrogen sulfide analysis of drill bit cuttings from a drilling sequence were determined through similar procedures given in Examples 1 and 2. Twelve grams of oily cuttings were ground in the presence of 10 milliliters of 3.0 percent by weight sodium hydroxide, the mixture filtered under vacuum using a Whatman No. 42 filter paper, washed with 10 to 20 milliliters of distilled water and the filtrate placed in 125 milliliters Erlenmeyer flask containing two grams of zinc shot 20–30 mesh and 20 milliliters of 1:1 hydrochloric acids to provide hydrogen sweep gas. The stoppered flask was swept with hydrogen sweep gas in order to evolve hydrogen sulfide gas which was allowed to pass through Kitagawa 120b hydrogen sulfide detection tubes. The hydrogen sulfide stain was measured after ½ to 1 hour. Heat was placed below the flask by warming on a sand bath to speed reaction and drive the hydrogen sulfide more effectively from the aqueous phase. The oily cuttings contained about 50% oil and were used without removing the oil. $H_2S$ in p.p.m. is based on the 12 gram sample of cuttings plus oil. Table III depicts the results of the analysis for 120 feet of formation encountered and illustrates a minimal presence of hydrogen sulfide.

TABLE III
Formation drill bit cutting results

| Depth interval (ft.) | $H_2S$ present (micrograms) | $H_2S$ present (p.p.m.) |
| --- | --- | --- |
| 0–10 | 136 | 11 |
| 10–20 | 87 | 7 |
| 20–30 | 67 | 6 |
| 30–40 | 45 | 4 |
| 40–50 | 41 | 3 |
| 50–60 | 46 | 4 |
| 60–70 | 44 | 4 |
| 70–80 | 54 | 5 |
| 80–90 | 31 | 3 |
| 90–100 | 58 | 5 |
| 100–110 | 70 | 6 |
| 110–120 | 69 | 6 |

Therefore, the present invention yields a process which is applicable to ranges of from about 1 to about 10,000 parts per million hydrogen sulfide or higher by varying the sample size and detection technique, for example the number of tubes utilized. The process may be utilized for cuttings from water base or oil base muds. Oils base muds containing as high as 50% cuttings and 50% oil have been successfully tested without first separating the oil. The process is specifically for adsorbed $H_2S$ only with mineral sulfides remaining unreacted during the treatment. The process represents a simplified and economical method for the determination of the presence of hydrogen sulfide deposits for exacting engineering of drilling during entrance of hydrogen sulfide formations.

While the invention has been described above with respect to certain embodiments thereof, it will be understood

I claim:

1. A process for the detection of the presence of hydrogen sulfide contained within drill bit cuttings which comprises:
   (a) mixing the drill bit cutting in the presence of a hydroxonium ion;
   (b) filtering the solids from the mixture of step (a);
   (c) washing the filtered solids from step (b);
   (d) adding the washed filtrate from step (c) with the filtrate from step (b);
   (e) passing free hydrogen through the filtrate accumulated in step (d); and
   (f) measuring the hydrogen sulfide generated in step (e).

2. The process of claim 1 in which the hydroxonium ion is provided by an aqueous solution of sodium hydroxide.

3. The process of claim 2 in which the free hydrogen is produced by adding zinc metal shot and hydrogen chloride to the filtrate.

4. The process of claim 3 further comprising the initial step of grinding the drill bit cuttings.

5. The process of claim 4 in which the filtering of the solids is under vacuum and with a water wash.

6. The process of claim 5 in which the aqueous sodium hydroxide concentration is from about 1 to about 10 weight percent.

7. The process of claim 6 in which the hydrogen sulfide is measured colorimetrically by passing the hydrogen sulfied gas generated over a hydrogen sulfide absorbent which is discolored by hydrogen sulfide absorption.

8. The process of claim 6 in which the hyrogen sulfide is measured gravimetrically by passing the hydrogen sulfide gas generated over a hydrogen sulfide absorbent and measuring the increased weight of the absorbent.

References Cited

UNITED STATES PATENTS

| | | | |
|---|---|---|---|
| 2,370,793 | 3/1945 | Horvitz | 23—230 EP |
| 3,660,035 | 5/1972 | Marsh | 23—230 R |

OTHER REFERENCES

Field et al.: Anal. Chem. 18, 668 (1946).

MORRIS O. WOLK, Primary Examiner

R. M. REESE, Assistant Examiner

U.S. Cl. X.R.

23—230 EP